US009242798B2

(12) United States Patent
Guan

(10) Patent No.: US 9,242,798 B2
(45) Date of Patent: Jan. 26, 2016

(54) DETERMINING STOWABILITY BASED ON ITEM-SIZE CATEGORIES

(71) Applicant: Amazon Technologies, Inc., Reno, NV (US)

(72) Inventor: Danny Guan, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

(21) Appl. No.: 14/473,051

(22) Filed: Aug. 29, 2014

(65) Prior Publication Data

US 2014/0364995 A1    Dec. 11, 2014

Related U.S. Application Data

(62) Division of application No. 13/528,214, filed on Jun. 20, 2012, now Pat. No. 8,825,197.

(51) Int. Cl.
| | | |
|---|---|---|
| *G06F 7/00* | (2006.01) | |
| *B65G 1/137* | (2006.01) | |
| *G06Q 10/08* | (2012.01) | |

(52) U.S. Cl.
CPC ............ *B65G 1/1371* (2013.01); *G06Q 10/087* (2013.01)

(58) Field of Classification Search
None
See application file for complete search history.

(56) References Cited

U.S. PATENT DOCUMENTS

| | | | | |
|---|---|---|---|---|
| 8,024,064 | B1 * | 9/2011 | Sanghavi | G06Q 10/087 700/213 |
| 8,244,603 | B1 * | 8/2012 | Tang | G06Q 10/0633 414/222.07 |
| 8,825,197 | B1 | 9/2014 | Guan | |
| 2007/0021863 | A1 * | 1/2007 | Mountz | G06Q 10/087 700/214 |
| 2007/0162423 | A1 * | 7/2007 | Alfandary | G06Q 10/08 |
| 2013/0124430 | A1 * | 5/2013 | Moir | G01G 19/083 705/330 |

* cited by examiner

*Primary Examiner* — Yolanda Cumbess
(74) *Attorney, Agent, or Firm* — Robert C. Kowert; Meyertons, Hood, Kivlin, Kowert & Goetzel, P.C.

(57) ABSTRACT

Methods, systems and apparatus for determining stowability based on item-size categories are described. Embodiments may select a storage module for a stow operation based on accessing stowability information. Stowability information, in various embodiments may include stowability information for each storage module in a materials handling system. Stowability information may indicate a capacity to hold additional items in a storage module. The capacity may be determined according an item-size category descriptor, describing the quantity of items in each category of a storage module, and a storage module capacity model characterizing item descriptors of fully-stowed storage modules. In some embodiments the storage module capacity model is a function fitted to data points representing the values of item-size descriptors of fully-stowed storage modules. Embodiments may update the stowability information for a storage module in response to the removal of an item from the storage module.

20 Claims, 10 Drawing Sheets

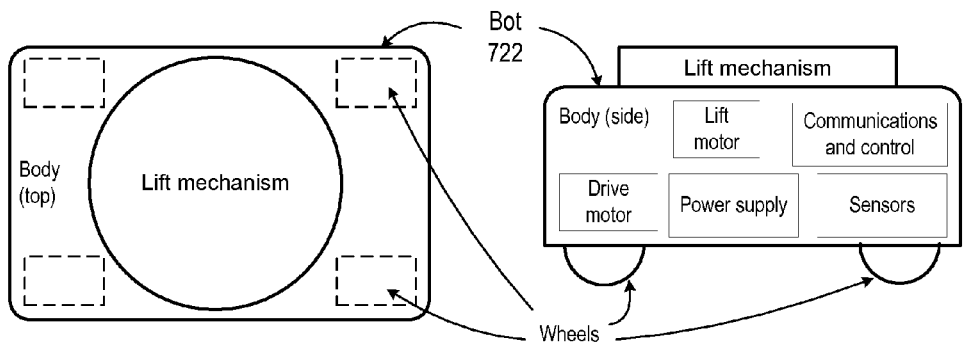
*Figure 8A*  *Figure 8B*
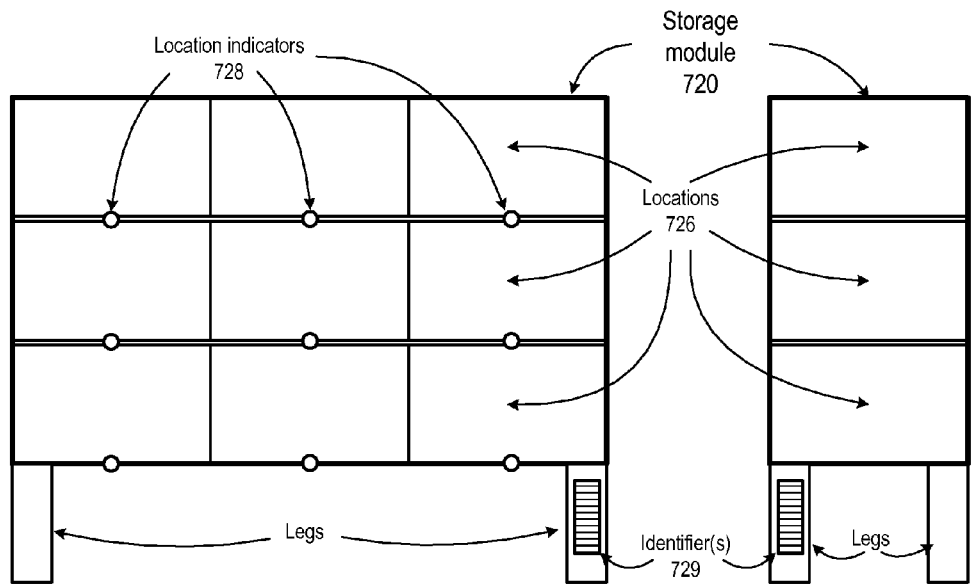
*Figure 9A*  *Figure 9B*
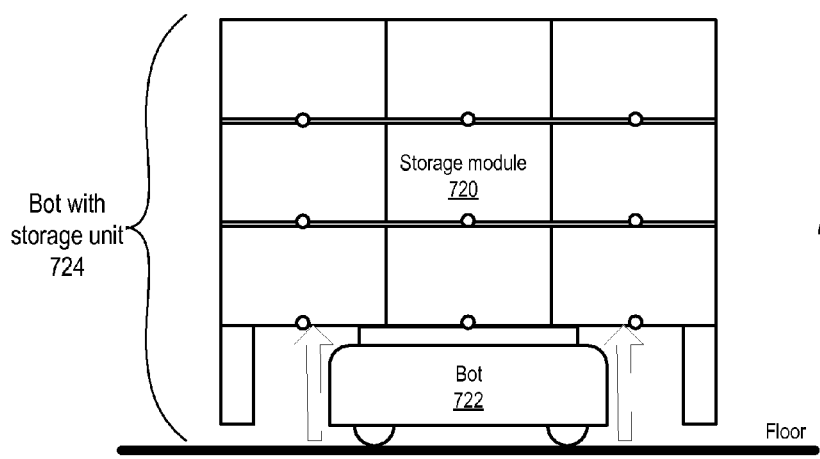
*Figure 10*

DETERMINING STOWABILITY BASED ON ITEM-SIZE CATEGORIES

This application is a divisional of U.S. patent application Ser. No. 13/528,214, filed Jun. 20, 2012, now U.S. Pat. No. 8,825,197, which is hereby incorporated by reference in its entirety.

BACKGROUND

Stocking various items received at one or more distribution centers, fulfillment centers, cross-docking facilities, materials handling facilities or warehouses (which may collectively be referred to as materials handling facilities) is a time consuming process in a typical distribution system. Generally, the stocking process, or stowing process as it sometimes referred to, transports items from a receiving area and places the received items into an inventory storage area in a materials handling facility. Items are placed in storage units with enough storage capacity to hold the additional items. Determining which storage unit has capacity to hold additional items is conventionally determined manually. A human stocker must visually inspect the storage units to locate a particular storage unit with sufficient capacity for the items ready to be stocked. This process proves time intensive when stockers must search over large inventory areas.

BRIEF DESCRIPTION OF THE DRAWINGS

FIGS. 8A and 8B illustrate views of an example mobile robotic device which may transport storage modules to stow stations, according to some embodiments.

FIGS. 9A and 9B illustrate views of an example storage module, according to some embodiments.

FIG. 10 illustrates an example of a mobile robotic device transporting a storage module, according to some embodiments.

Figure 1:
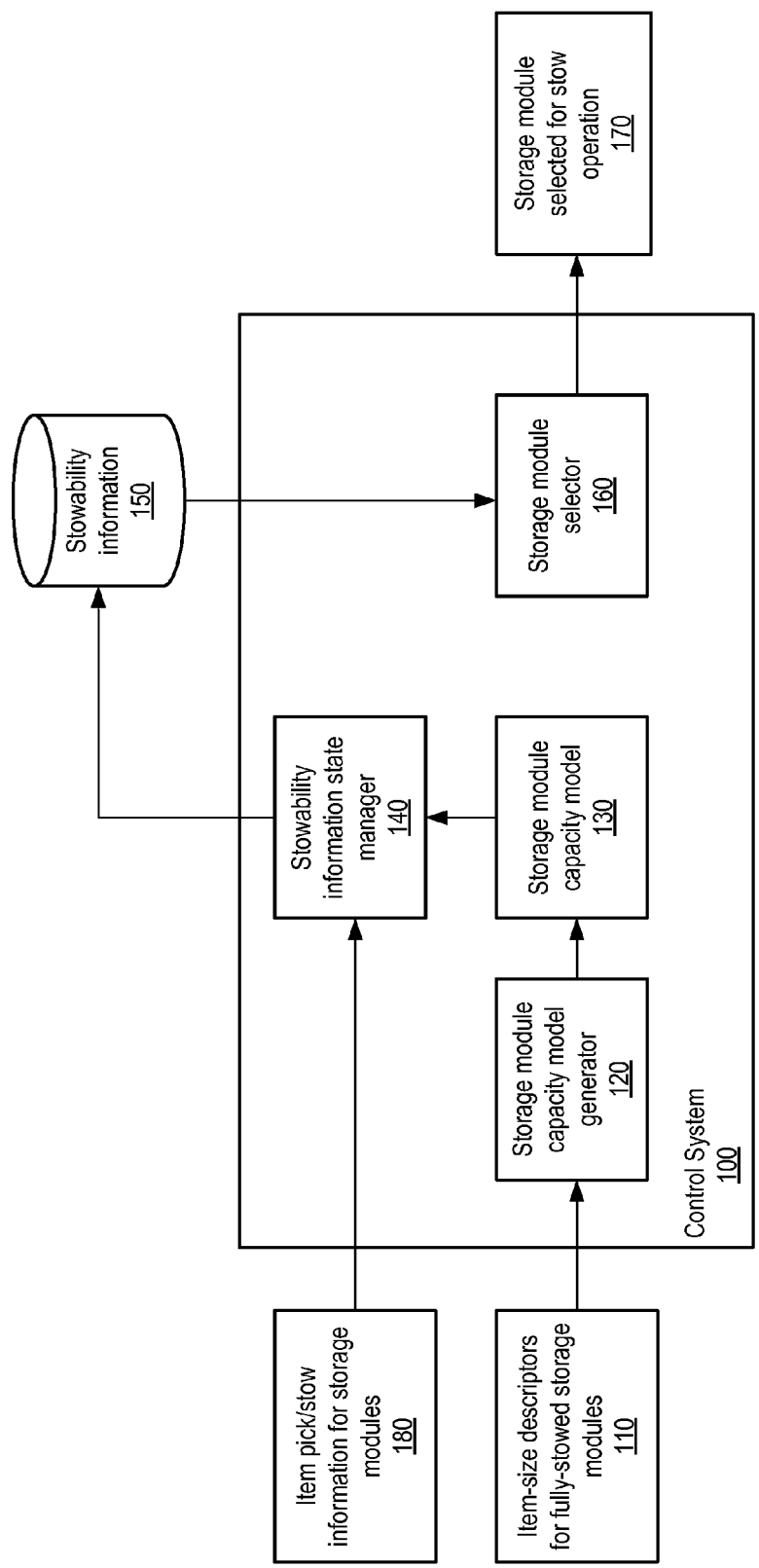
FIG. 1 illustrates an example control system which may direct stow operations according to storage capacity, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

In the following detailed description, numerous specific details are set forth to provide a thorough understanding of claimed subject matter. However, it will be understood by those skilled in the art that claimed subject matter may be practiced without these specific details. In other instances, methods, apparatus, or systems that would be known by one of ordinary skill have not been described in detail so as not to obscure claimed subject matter.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Various embodiments of methods, systems, and apparatus for determining stowability based on item-size categories in materials handling facility are described. A materials handling facility, such as one or more distribution centers, fulfillment centers, cross-docking facilities, materials handling facilities or warehouses, may receive items for storage in an inventory area. The process of stocking items, oftentimes and hereinafter referred to as stowing items, into the inventory area may involve transporting received items and stowing them in one of many storage modules located in the inventory area. Storage modules may already hold varying amounts of items. Additionally, storage modules may have different sizes or configurations which affect the storage capacity of a particular storage module to hold additional items. Selecting which storage module to stow items into may be accomplished by comparing the stowability, the capacity of a storage module to hold additional items, of the storage modules to identify storage modules with the most stowability.

In some embodiments, a control system may be implemented in a materials handling facility. When items received at the materials handling facility are ready to be stowed, the control system may direct a stow operation, performed by a human or robotic device, to stow the items into a selected storage module. The control system may select from among the many storage modules in a materials handling facility to stow items into by comparing the stowability of the storage modules and selecting a storage module with the most stowability. The control system may have access to the stowability information of the storage modules.

Stowability information accessible by a control system may include stowability information for each storage module in the materials handling facility. Stowability information for a storage module may include a capacity of the storage module to hold additional items. The capacity to hold additional items may be based on a storage module capacity model. The storage module capacity model may describe various configurations of items in fully-stowed storage modules. To determine the capacity to hold additional items for a storage module, various embodiments may apply the storage module capacity model to the items already held in the storage module, which are categorized into different item-size categories. Items may be identified as belonging to an item-size category according to the size information for the particular item.

In various embodiments, a control system may track the capacity of storage modules to hold additional items, updating the stowability information as items are picked, or removed, from the storage modules. The control system may also update the stowability information for a storage module as stow operations stowing items into the storage module are completed.

In some embodiments, a control system may direct mobile robotic devices (referred to herein as bots) to transport storage modules from the inventory area to stow stations. At the stow stations, human or automated stowers may perform stow operations, stowing received items into storage modules. When the storage module is fully stowed, a control system may direct a bot to return the storage module to the inventory area of the materials handling facility.

Figure 7:
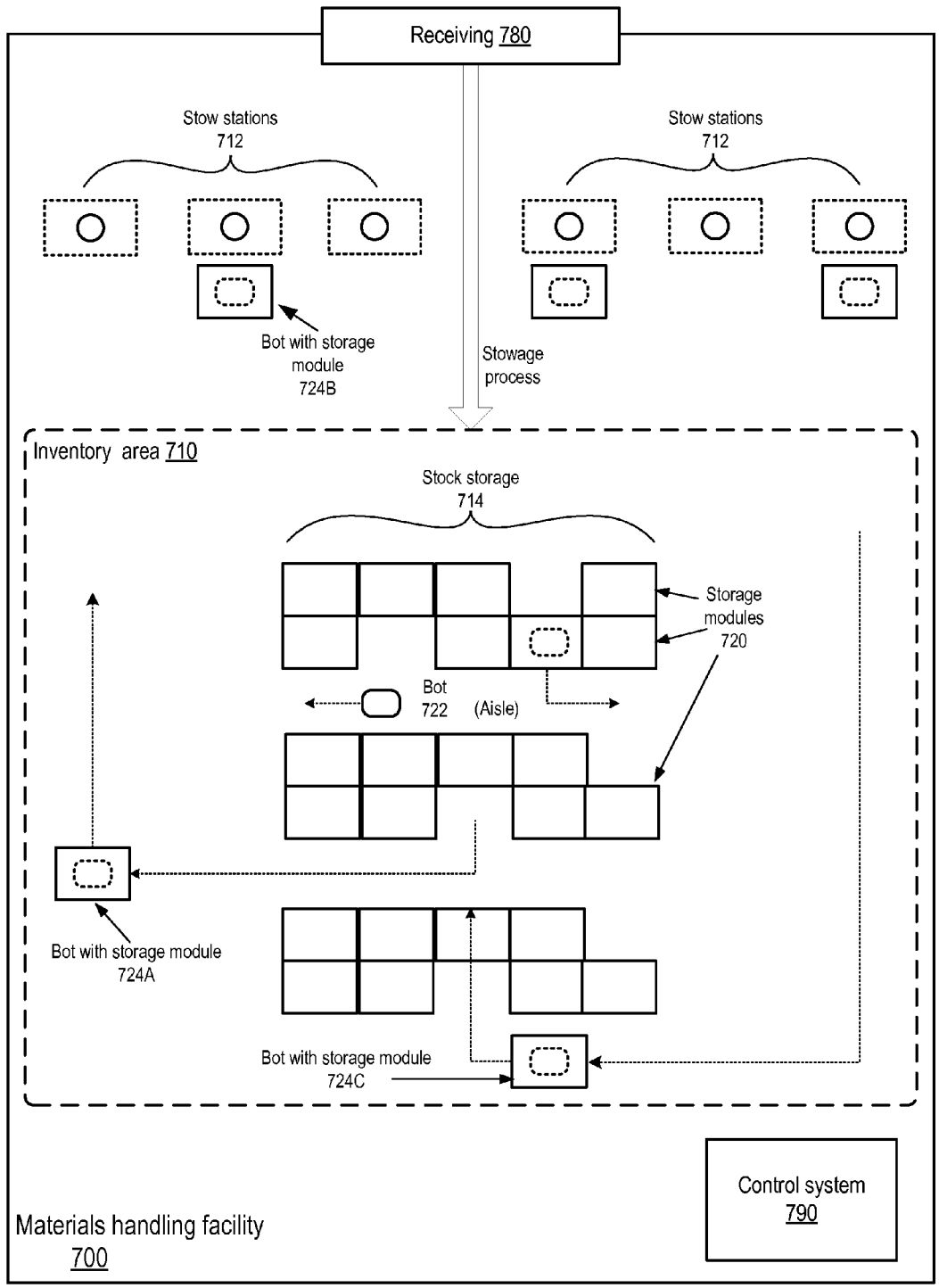
FIG. 7 illustrates an example of a physical layout of the inventory area of a materials handling facility in which mobile robotic devices may transport storage modules to stow stations, according to some embodiments.
Figure 11:
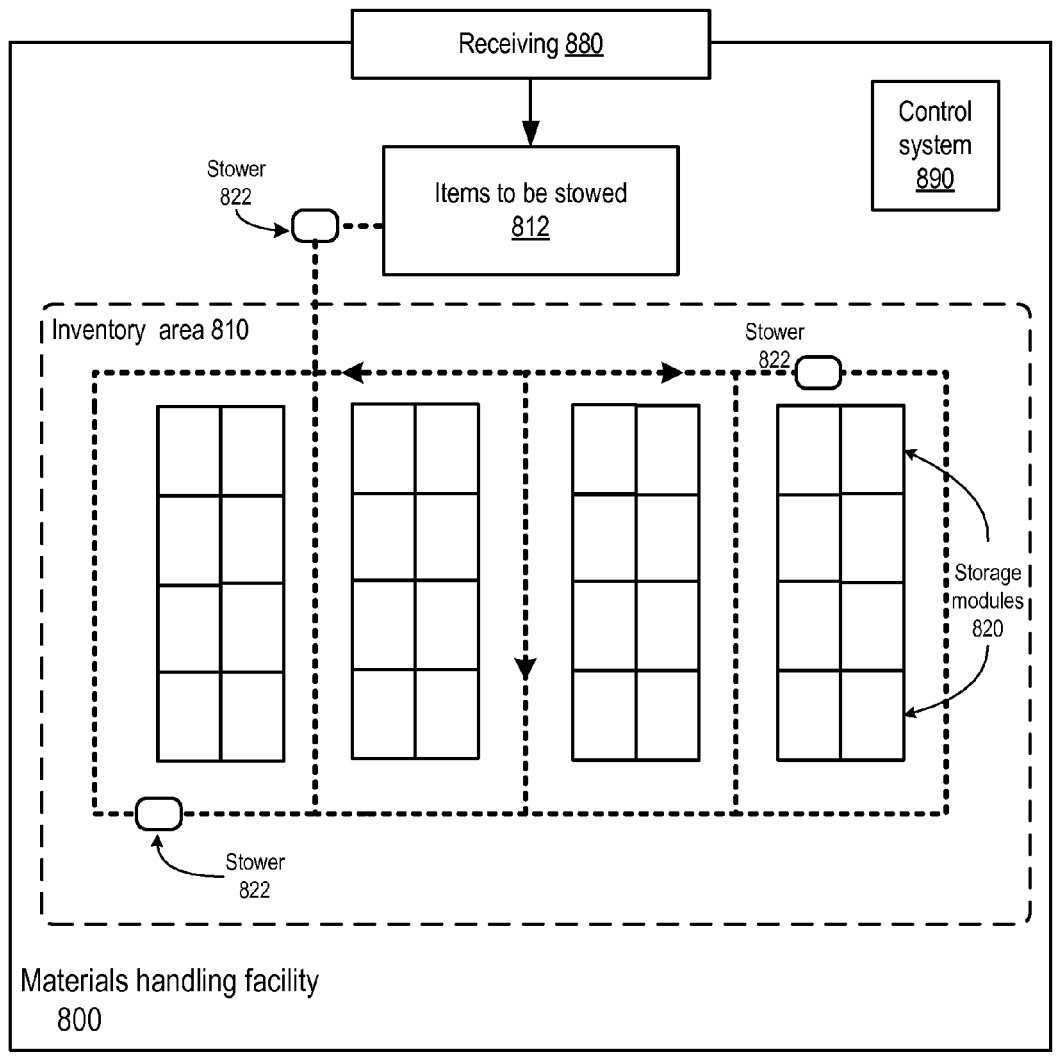
FIG. 11 illustrates an example of a physical layout of the inventory area of a materials handling facility in which items may be transported to an inventory storage area, according to some embodiments.

Embodiments of the method for determining stowability based on item-size categories may, for example, be implemented in a materials handling facility, such as depicted in FIG. 7, including a stow process that employs stow stations. Bots may transport storage modules to stow stations where stowers may stow items into the storage modules. However, embodiments of the method for determining stowability based on item-size categories may be implemented in other materials handling facilities that employ other stow process, such as stow processes that direct human or robotic stowers to the storage modules in an inventory area, such as illustrated in FIG. 10, to perform stow operations. More generally, embodiments of the method for determining stowability based on item-size categories may be implemented in any materials handling facility that stows received items into an inventory area.

Example Control System

Various embodiments may implement a method for determining stowability based on item-size categories in a control system in a materials handling facility. FIG. 1 illustrates an example control system which may implement a method for determining stowability based on item-size categories to direct stow operations, such as selecting a storage module with the most stowability, according to some embodiments. The control system depicted in FIG. 1 may be implemented on one system or computing device, such as system 900 described below with respect to FIG. 12, or implemented across several computing systems or devices. In some embodiments, the control system in FIG. 1 may be part of a larger control system directing the various operations of a materials handling facility discussed below with regard to FIG. 2.

A control system, such as control system 100, may obtain information from various other systems or components in a materials handling facility. Communications between the control system and other systems may occur over a variety of standard or customized communication technologies, such as wired or wireless networks. For instance, control system 100 may receive item-size descriptors for fully stowed modules 110 from some measurement system or database. Embodiments of a control system 100 may obtain this information to direct stow operations.

In some embodiments, a control system may select a storage module from among the storage modules in a materials handling facility to stow items into based on stowability information for the storage modules. Storage module selector 160 may be configured to access stowability information 150. Stowability information 150 may be a database or other variety of data storage which stores stowability information for the storage modules in a materials handling facility. As discussed above the stowability information for storage modules may be the capacity of storage modules to hold additional items. Stowability information 150 may located external to control system 100 or located internally (not depicted).

Figure 3:
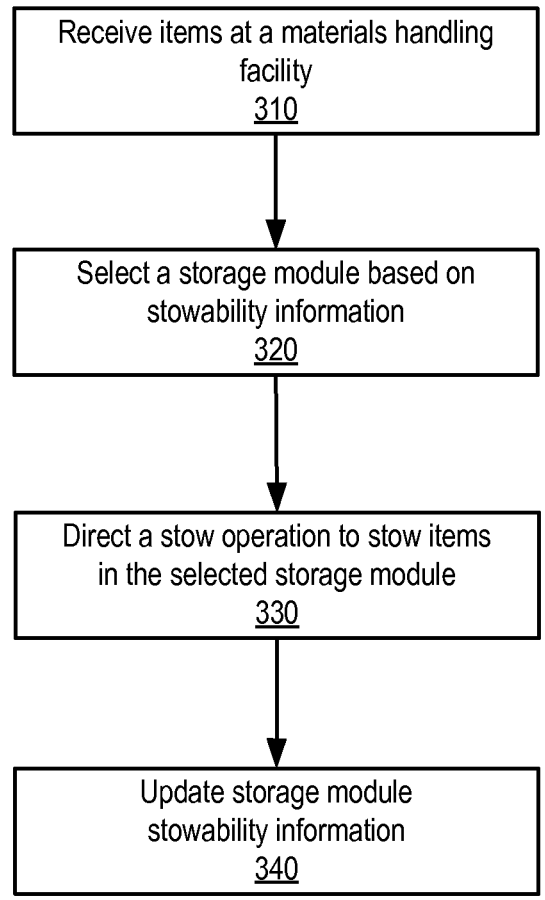
FIG. 3 illustrates a high-level flowchart of a method to select a storage module based on stowability information, according to some embodiments.
Figure 6:
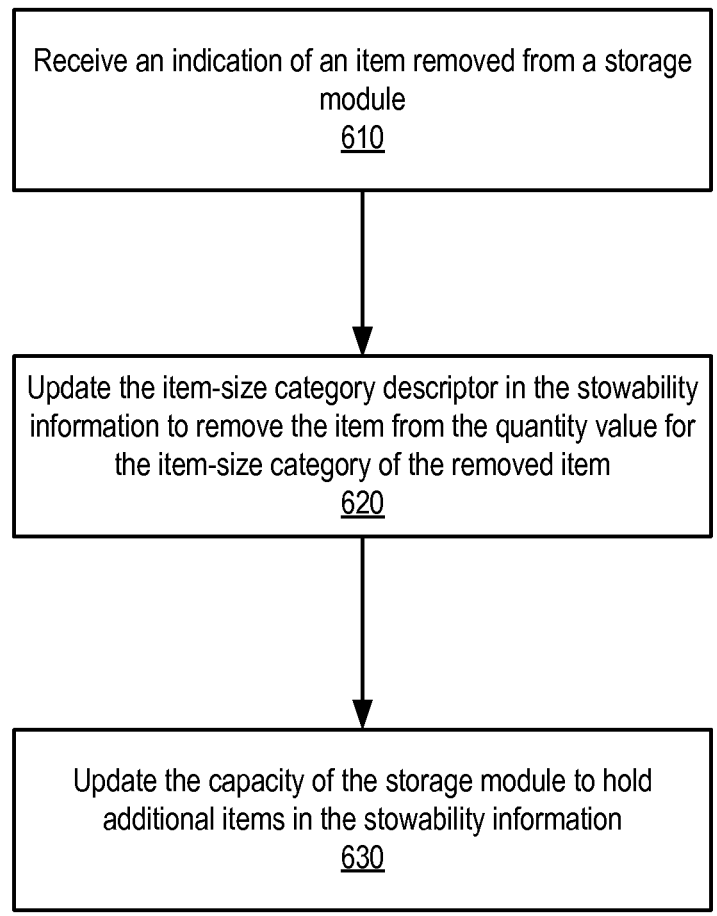
FIG. 6 illustrates a high-level flowchart of a method to update the item-size category descriptor of a storage module in stowability information, according to some embodiments.

The capacity of storage modules to hold additional items as indicated in stowability information 150, may be determined, tracked, or updated by a stowability information state manager 140 implementing various methods discussed below with regard to FIGS. 3 and 6. To determine the stowability for storage modules, stowability information state manager 150 may be configured to apply a storage module capacity model 130 to the quantity of items held in a storage module, categorized into item-size categories. The quantity of categorized items held in a storage module may be described using an item-size category descriptor.

A storage module capacity model 130 may be generated by a control system's storage module capacity model generator 120. Storage module capacity model generator 120 may be configured to generate one or more storage module capacity models for control system 100. The storage module capacity model generator 120 may be configured to obtain item-size descriptors for fully-stowed modules to generate storage module capacity models, such as storage module capacity model 130, implementing the various methods described below with regard to FIGS. 4 and 5. In some embodiments, multiple storage module types may be used such that storage module capacity model generator 120 may generate storage module capacity models for each storage module type.

As items are picked from storage modules, described below at 260 in FIG. 2, stowability information 150 may be updated by the stowability information state manager 140 to reflect the removal of the items from the inventory area. Particular methods and embodiments for updating the stowability information 130 are discussed below with regard to FIGS. 3 and 6. The stowability information state manager 140 may be configured to obtain item pick and stow information for storage modules 180. For instance, a system or device external to the control system 100 may send pick information over wired or wireless networks to the control system. For example, in some embodiments as items are picked from storage modules or stowed in storage modules, an inventory management system may indicate over a wired network to the control system 100 that certain items have been picked or stowed or are scheduled to be picked or stowed in a particular storage module. A robotic or human picker or stower may operate some access device to indicate in the inventory management system picked or stowed items. In another example, a control system 100 may be configured to receive from a portable inventory reporting device reports of picked or stowed items. A portable inventory reporting device may be a mobile or portable, computing or electronic device capable of reporting picked or stowed items directly to a control system 100 or to an inventory management system which then reports the picked or stowed items to the control system 100. Such a device may be a handheld electronic device that scans item barcodes or radio frequency identification (RFID) tags to indicate over a wireless network to the control system 100 that the scanned item has been picked from a particular storage module.

The updating and tracking provided by the stowability information state manger 140 to stowability information 150 may allow storage module selector 160 to select storage modules with the most stowability for a stow operation. Storage module selector 150 may be configured to implement the various methods and embodiments for selecting a storage module discussed below with regard to FIG. 3. Control system 100 may direct a stow operation for stowing items on the select storage module 170. Various communication methods and devices may be targeted for the directed stow operation. For example, in some embodiments a portable inventory reporting device, such as discussed above, may include a display screen that displays stow directions received over a wireless network from the control system for received items. The portable inventory reporting device may display stow directions for one or more items to be stowed in a selected storage module. In another example, some embodiments may employ one or more stow stations where items received at the materials handling facility may be stowed into a storage module. In at least some embodiments, a control system 100 may direct a bot over a wireless network to transport the selected storage module 170 from an inventory area to a stow station. Upon completion of the stow operation, the control system 100 may direct a bot to transport the storage module 170 back to the inventory area. A control system 100 may direct a stow operation for stowing items in a selected storage module to various other devices, such as display device viewable by human stowers.

Overview of Materials Handling Facility Operation

In various embodiments a control system may be implemented in a materials handling facility. FIG. 2 illustrates a logical representation or view of the operation of a materials handling facility in which embodiments of methods, systems, and apparatus for determining stowability based on item-size categories may be implemented. For example, this Figure may illustrate an order fulfillment center of a product distributor. Multiple customers 240 may submit orders 250 to the product distributor, where each order 250 specifies one or more items from inventory 222 to be shipped to the customer that submitted the order. To fulfill the customers' orders 250, the items specified in the orders 250 may be retrieved, or picked 260, from inventory 222 (which may also be referred to as stock storage) in the materials handling facility. The picked items may be conveyed, by the conveyance mechanism to one or more stations in the materials handling facility for downstream processing, for example sorting 270 into their respective orders, packing 280, and finally shipping 290 to the customers 240.

A materials handling facility may also include a receiving 220 operation for receiving inventory items 210 from one or more sources (e.g., vendors) and for stowing the received items according to a stowing process 230 into item storage (inventory 222). The receiving 220 operation may also receive and process returned purchased or rented items or orders from customers. At least some of these returned items are typically returned to inventory 222.

Figure 2:
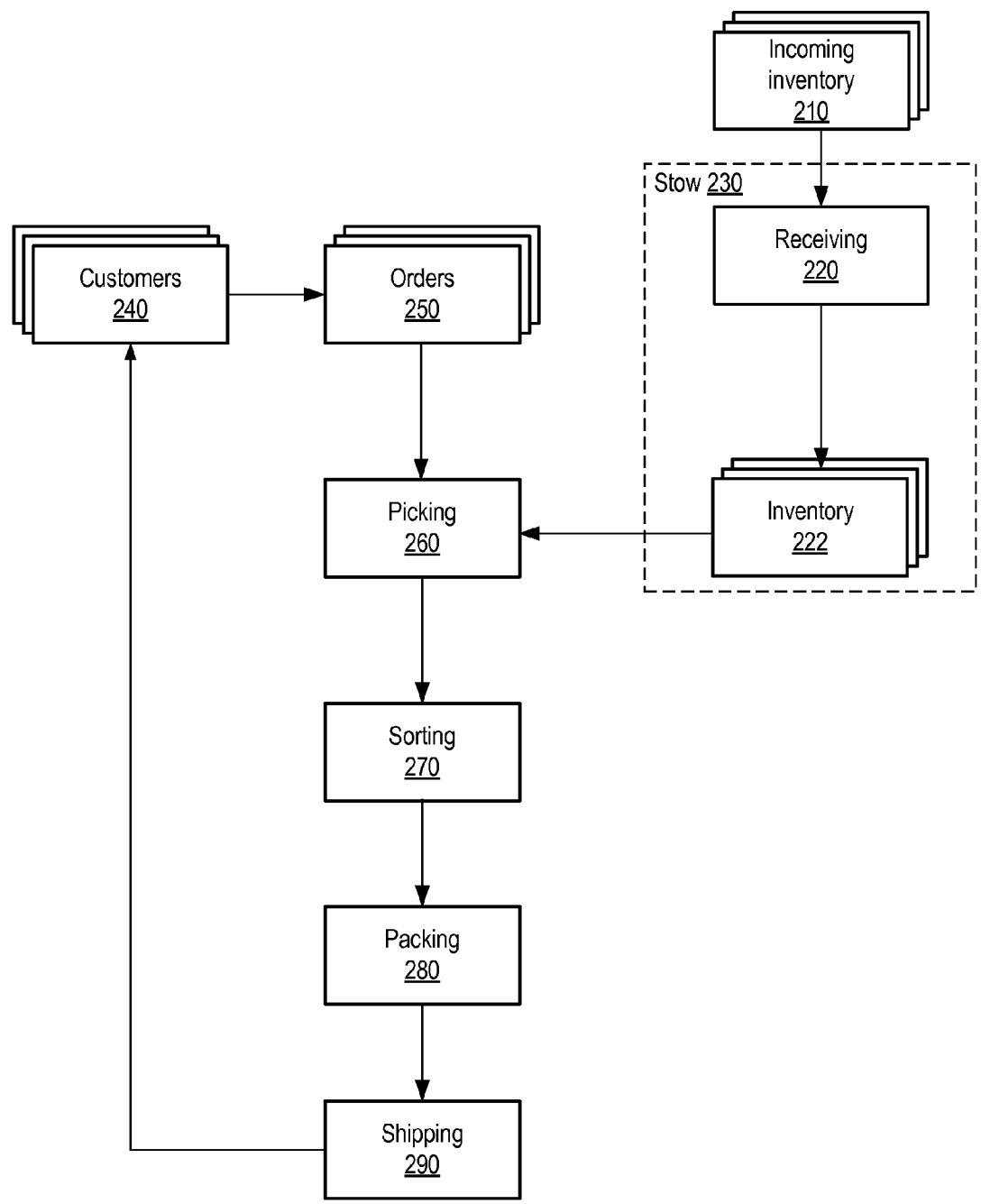
FIG. 2 illustrates a logical representation or view of the operation of a materials handling facility, according to some embodiments.

In at least some embodiments, rather than stowing directly to inventory 222 as shown in FIG. 2, received inventory may be delivered to one or more stowing stations (not shown). Under direction of a control system, such as described above with regard to FIG. 1, storage modules may be automatically moved from inventory 222 to particular stowing stations, for example using the robotic devices. At the stowing station(s), the received inventory may be manually or automatically placed in locations on the storage modules under direction of the control system. The storage modules are then returned from the stowing station(s) to inventory 222, for example using the robotic devices. In some embodiments, induction and stowing may be combined at one station so that individual items for orders can be inducted into the conveyance mechanism from storage modules for delivery to one or more downstream processing stations (e.g., sorting stations) and received items can be stowed to the same storage modules prior to the storage modules being returned to inventory 222; storage modules may also be moved from inventory 222 to the induction/stowing station(s) specifically for stowing.

The various operations of a materials handling facility may be located in one building, or alternatively may be spread or subdivided across two or more buildings. In addition, a materials handling facility may include one or multiple levels or floors. For example, a materials handling facility that includes inventory 222 may include one, two, or more levels; in multi-level facilities, inventory 222 may be spread across two or more levels. The total floor space of a materials handling facility may be anywhere from tens of thousands of square feet to more than a million square feet, although embodiments may be implemented in smaller facilities.

Workflow for Selecting a Storage Module

Embodiments of determining stowability based on item-size categories may be implemented in a control system, such as described above with regard to FIG. 1. A control system may select a storage module based on stowability information and direct performance of a stow operation for stowing items received at the materials handling facility into the selected storage module. FIG. 3 illustrates a high-level flowchart of a method to select a storage module based on stowability information, according to some embodiments.

Embodiments may receive items 310 at a materials handling facility as discussed above with regard to receiving 220 in FIG. 2. Items may be received from various sources including manufacturers, other distributers, or from customers returning items. Received items may be placed into receiving and transported from receiving to the inventory area. In some embodiments, the received items may be transported to various stow stations in a stow area.

A control system, such as control system 100 in FIG. 1, may select storage module out the multiple storage modules in the materials handling facility based on stowability information 320. A control system may be configured to access stowability information for the storage modules. The stowability information may be in a separate database or other data storage device, such as stowability information 150 described above in FIG. 1, or as part of a larger database or system, such as an inventory management system. The stowability information for each storage module may indicate a capacity of the storage module to hold additional items. The capacity indicated may be a numeric value or percentage. The capacity of the storage module to hold additional items may be determined according to a storage module capacity model, such as a storage module capacity model 130 generated by storage capacity model generator 120 discussed above with regard to FIG. 1, applied to an item-size category descriptor for items currently held in the storage module. An item-size category descriptor may include a quantity value for each different item-size category. Each quantity value may indicate a total quantity of items stored in the storage module categorized in one of many different item-size categories.

For example, an item-size category descriptor for a storage module may include 10 small item-size category items, 6 medium item-size category items, and 2 large item-size category items. The capacity to hold additional items for the storage unit may be determined by applying a storage module capacity model, such as a function that describes full capacity storage modules described below with regard to FIGS. 4 and 5, to this information to determine the capacity of the storage module. If for example, 10, 6, and 2 were plotted in a space of three dimensions, with each dimension corresponding to small, medium, and large, the distance from the point at (10, 6, 2) to the model function may represent the space left for items that may be additionally stored in the storage module before it is fully-stowed. Thus, this distance may be used to indicate the capacity of the storage module to hold additional items. Various methods and embodiments for generating a storage module capacity module and determining the capacity of a storage module are discussed below with regard to FIGS. 4 and 5.

A control system may select a storage module for a stow operation based on the accessed stowability information. In some embodiments, the control system may select the storage module having the most capacity to store additional items. For example, if the capacities for storage modules are indicated as numbers or percentages, a control system may select the storage module with the greatest indicated number or percentage. Embodiments may also base selection decisions on other information in addition to the accessed stowability information. For example, a control system may select a storage module with a capacity to hold additional items above a certain threshold and within a certain radius from a particular stow station.

Various embodiments may direct performance of a stow operation 330 stowing items received at the materials handling facility into the selected storage module. For example, a control system may display a message on a display device that a stower might read, or print out directions to a particular storage module where the stower, human or robotic, may stow items. Some embodiments may direct a bot to transport the selected storage unit to a stow station. At the stow station, received items may be stowed into the selected storage unit. Upon completion of the stow operation, some embodiments may direct a bot to transport the storage module back to the inventory area.

Some embodiments may track the capacity of the storage modules and update the stowability information for the storage module 340 upon completion of a stow operation stowing items into a storage module. In some embodiments the stowability information may be updated in response to stowing a single item into a storage module. In other embodiments, the stowability information may be updated upon an indication that the storage module currently being stowed is full. Updating the stowability information may include updating the quantity values of the item-size category descriptor to reflect the additionally stored items. The item-size category for items stowed in a storage module may be determined, for example by accessing item information in an item database, and the updating the quantity value for the item. For example, if a storage module had prior to a stow operation 1 small, 2 medium and 0 large items, and 4 medium items and 3 large items were determined to be stowed in the storage module after which the storage module was indicated full, the quantity values in the item-size category descriptor for the storage module would be 1 small, 6 medium, and 3 large items. Some embodiments may update the indicated capacity to hold additional items in the stowability information according to the various methods discussed below with regard to FIGS. 4 and 5. In some embodiments an item database tracks the location of stowed items, and the item stowability information communicates with the item database to obtain the item-size category descriptor for a storage module and indicates the updated capacity according to the information obtained from the item database.

Workflow for Generating a Storage Module Capacity Model

Figure 4:
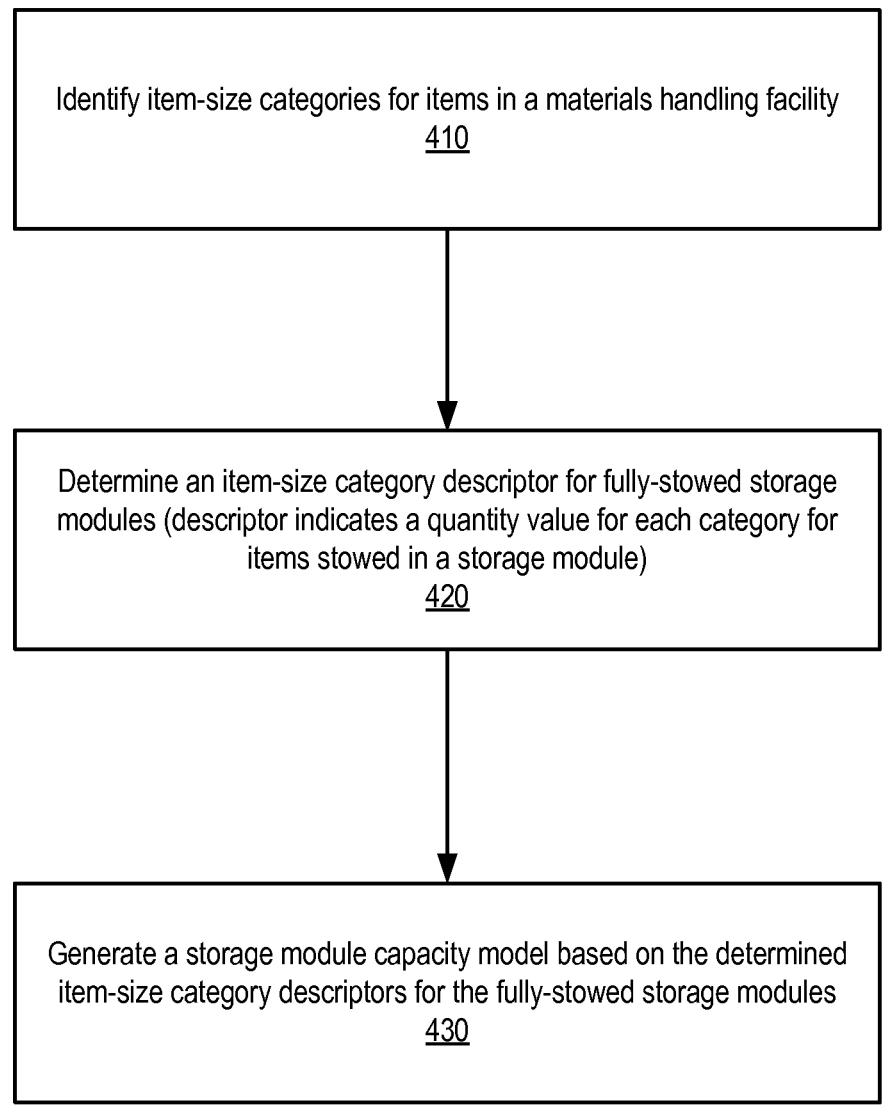
FIG. 4 illustrates a high-level flowchart of a method to generate a storage module capacity module based on item-size category descriptors, according to some embodiments.

A control system, such as discussed above with regard to FIG. 1 may implement various components to determine stowability based on item-size categories. In some embodiments, control system including storage module capacity model generator 120 may implement various methods to generate multiple storage module capacity models. FIG. 4 illustrates a high-level flowchart of a method to generate a storage module capacity module based on item-size category descriptors, according to some embodiments.

Various embodiments may identify an item-size category for each item 410 in a materials handling facility. These items may be still in receiving, such as discussed above with respect to receiving 220 in FIG. 2, or may be currently stored in the inventory area in various storage modules. Multiple item-size categories may exist and use descriptive labels, such as small, medium, and large. However, non-descriptive labels, such as category 1, category 2, and category 3 may be used. The number of item-size categories may not be limited, and therefore the number of item-size categories may be optimized according to the sizes or types of items received at the materials handling facility. For example, if a materials handling facility specialized in distributing bed mattresses, the number of item-size categories may be 4, for twin, full, queen and king size mattresses. If in another example, a materials handling facility carried a wide range of items, the item-size categories may be less optimized and more descriptive, such as small, medium, large, and extra-large. The item-size category for each item may be determined according to the size information for the item. Each item-size category may be defined as a range. Each range may be defined as a range for a size dimension, such as small is described by a range of item width between 1 and 6 inches, or defined as a range in terms of space, such as small items are from 1 to 10 cubic inches. In various embodiments the boundaries between item-size categories may be adjacent to one another, such as small 1 to 5, medium 6 to 10, and larger 11 to 20, or leave gaps, such as small is 1 to 4, medium 6 to 10, and large 12 to 20. In some embodiments item size information may be inconsistent and the same type of item may be categorized into a different item-size category. For example, the size information for a bag may be measured without any packing for the bag. If then another bag of the same type of bag is measured in a shipping box, then the same bag may be in two different item-size categories. Various methods and techniques for sorting items into item-size categories may be implemented which are well-known to those of ordinary skill in the art in addition to the examples above. Therefore, none of the above examples are intended to be limiting.

Size information for items may be obtained from various sources. Some size information for items may be obtained from the manufacturer or distributer who shipped the item to the materials handling facility. Size information may be obtained from an item database or item, or inventory, management system, storing item size information according to each uniquely identified item. For example, when an item is received at a materials handling facility the item size information may be obtained from an item database via a globally unique identifier for the item in the database. Size information may also be obtained by measuring items received at a materials handling facility, such as by measuring the dimensions of an item, e.g., using an optical item dimension scanner (e.g., a CUBISCAN system), or other measurement tool or technique.

Embodiments may then determine an item-size category descriptor for fully-stowed storage modules 420 in a materials handling facility. As discussed above the item an item-size category descriptor may be represented as several values corresponding to the quantity of items in an item-size category stored in a storage module. Fully-stowed storage modules may be indicated to a control system by an external database, such as an inventory management system, or be indicated as fully-stowed in stowability information, such as stowability information 150 in FIG. 1. Fully-stowed storage modules may also be identified as modules that have completed a stow operation and are returned to the inventory area. For fully-stowed storage modules in a materials handling facility, a control system may access stowability information or an inventory management system to determine the quantity value of items in each item-size category in the full capacity storage modules. The item-size category descriptor representing these values may be a data structure or format that represents both quantities and types of item-size categories. In some embodiments, the item-size category descriptor is stored as a data point in n-dimensional space, where each dimension corresponds to an item-size category. For example, if item-size categories are small, medium, large, and extra-large, the item-size category descriptor would be a data point in 4-dimensional space for a given storage module with 1 small, 1 medium, 1 large, and 1 extra-large item represented as (1, 1, 1, 1).

Embodiments may generate a storage module capacity model 430 based on the item-size category descriptors for the fully-stowed storage modules. A storage module capacity model may characterize item-size category descriptors for storage modules at fully-stowed with items. In some embodiments, each item-size category descriptor for the fully-stowed storage modules may be mapped as data points in an n-dimensional space. Each dimension of the n-dimensional space may correspond to a different item-size category. Each quantity value of the item-size category descriptor may map to a different dimension on the n-dimensional space. A function may be fitted to the data points in the n-dimensional space to describe the item-size category descriptors for the full capacity storage modules. In some embodiments, several storage module types may exist for storage modules. Storage module capacity models may be generated according to the discussed methods for each storage module type.

Figure 5:
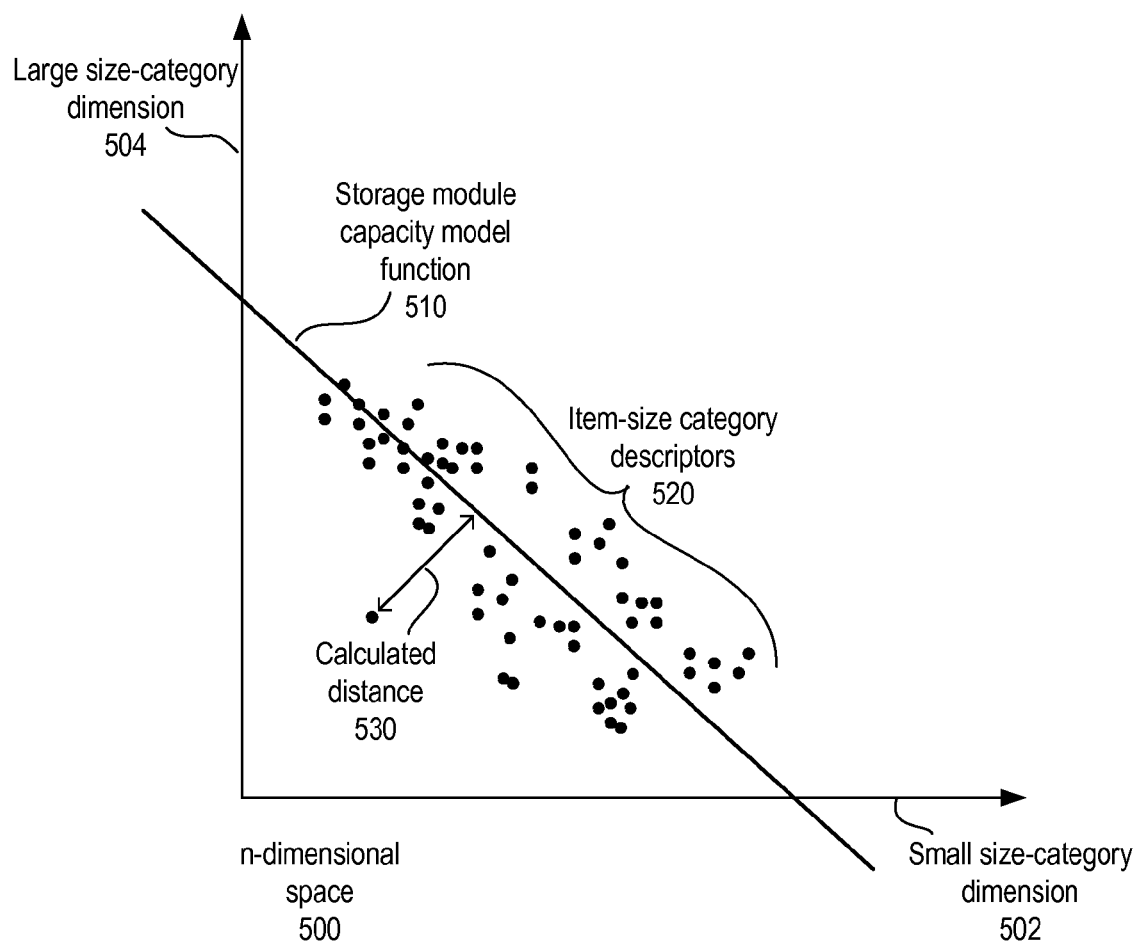
FIG. 5 illustrates an example of a storage module capacity model as a function fitted to describe item-size category descriptors, according to some embodiments.

FIG. 5 illustrates an example of a storage module capacity model represented as a function fitted to describe item-size category descriptors, according to some embodiments. In the Figure, the n-dimensional space 500 includes two dimensions, a small size-category dimension 502 corresponding to a small item-size category and a large size-category dimension 504 corresponding to a large item-size category. The item-size category descriptors 520 are mapped according to the number of small and large item-size category items in each fully-stowed storage module. Using the data points, various well-known techniques, such as linear or non-linear regression techniques, may be used to fit a function to the data points, such as the storage module capacity model function 510. Note that the drawing in FIG. 5 appears to display a line in the space for the storage module capacity model function 510. However, as the number of dimensions may be up to n values, a function model may be a line, plane, or multi-dimensional shape, and as such the model depicted at 510 in FIG. 5 is not intended to be limiting.

In some embodiments, to determine the capacity of the storage module to hold additional items the item-size category descriptors for items currently held in the storage module may be represented as values. Each value corresponds to a different item-size category, and each value indicates a total quantity of items stored in the storage module categorized in one of the item-size categories. For example, if a storage module has an item descriptor that represents the 3 small, 4 medium, and 5 large items, the values may be 3, 4, and 5. Embodiments may then map the values to an n-dimensional space with each dimension of the n-dimensional space corresponding to an item-size category. For example, in FIG. 5 the item size category descriptors 520 may be the values of the item-size category mapped to the dimensions small, medium, and large. Embodiments may then calculate a distance from the location of the values in the n-dimensional space to the function for the storage module capacity model. FIG. 5 illustrates the calculated distance 530 between a location of a value in the n-dimensional space 500 and the storage module capacity model function 510. Note that the drawing in FIG. 5 appears to display a line in the space for the storage module capacity model function 510. However, as the number of dimensions may be up to n values, a function model may be a line, plane, or shape, and as such the model depicted at 510 in FIG. 5 is not intended to be limiting. Calculating the distance between the value and the function may be implemented using various well-known techniques, such as calculating the difference between the values represented as a vector and the function. Numerous other techniques may be employed to determine the distance and the above example is not intended to be limiting.

Workflow of Updating Stowability Information

As various items are stowed or picked from storage modules in an inventory area in a materials handling facility, various embodiments of a control system, such as control system 100 described with regard to FIG. 1, may track the capacity of the storage modules in a materials handling facility to hold additional items. FIG. 6 illustrates a high-level flowchart of a method to update the item-size category descriptor of a storage module in stowability information, according to some embodiments.

Various embodiments may receive an indication of an item being removed from a storage module 610, such as the item pick information 180 described above with regard to FIG. 1. As discussed above, various systems and devices may communicate with a control system, such as over wired or wireless networks, to indicate an item's removal from a storage module. For example, a portable inventory reporting device, such as portable inventory reporting device discussed above with regard to FIG. 1 may send a wireless indication to a control system of an item being picked from a storage module. Likewise, an inventory management system, such as an inventory management system discussed above in FIG. 1, may also communicate an indication of an item's removal to a control system.

In response to receiving an indication of an item being removed from storage module, a control system, such as using a stowability information state manager 140 described above in FIG. 1, may update the item-size category descriptor in the stowability information for the storage module to remove the item from the quantity value for the item-size category of the removed item 620. Embodiments may determine the item-size category for the removed item. This determination may be made using item size information, such as discussed above at 410 in FIG. 4, to identify an item-size category for the removed item. Once the item-size category of the removed item is determined, the control system may update the quantity value of the item-size category descriptor for the storage module from which the item was removed.

In some embodiments, the capacity of the storage module to hold additional items in the stowability information may be updated 630 also by the control system, such as a control system implementing a stowability information state manager 140 in FIG. 1. The update may occur in response to an item's removal from a storage module, applying the storage module capacity model to the updated item-size category descriptor. In other embodiments, the update may occur when a control system accesses the stowability information.

Example Layout of a Materials Handling Facility with Mobile Robotic Devices

FIG. 7 illustrates an example of a physical layout of the stow area of a materials handling facility in which mobile robotic devices may transport storage modules to stow stations, according to some embodiments. The number, relative size, and arrangement of elements in FIG. 7 are given by way of example, and are not intended to be limiting. Materials handling facility 700 may include one or more inventory 710 areas. Each inventory 710 area includes a stock storage 714 that includes a plurality of storage modules 720. Each storage module 720 may include one or more locations (e.g., slots, shelves, partitions, bins, etc.) in which units of items are stowed. Storage modules 720 may have several storage module types. For example, a storage module type may be a bay on a four-side storage unit. Several storage modules may be located on a storage unit or apparatus. Each storage module 720 may stow one or more different types of items.

Each inventory 710 area also includes one or more stow stations 712. In this example, inventory 710 area includes six stow stations 712. At any one time, one or more bots 722 may be moving storage modules 720 from stock storage 714 area to stow stations 712 to stow items in storage modules, under direction of control system 790. In at least some embodiments, to move a storage module 720, a bot 722 may move under the storage module 720, lift the storage module 720, and then move the storage module 720 to a destination (e.g., a particular stow station 712) under direction of control system 790. FIG. 7 shows several examples of bots with storage modules 724. For example, FIG. 7 shows bot with storage module 724A moving from stock storage 714 towards a stow station 712, bot with storage module 724B at a stow station 712, and bot with storage module 724C moving from a stow station 712B to stock storage 714. FIGS. 8A and 8B illustrate an example bot, FIGS. 9A and 9B illustrate an example storage module, and FIG. 10 illustrates an example bot with storage module.

A stow area may also include one or more receiving 780 operations or areas for receiving shipments of stock from various vendors. Received stock may be placed into stock storage 714 in one or more inventory 750 areas. The receiving 780 operation may also receive and process returned, purchased, or rented items from customers. At least some of these items may be restocked into an inventory 750 area.

In at least some embodiments, rather than stowing directly to stock storage received inventory may be delivered to one or more stowing stations 712. Under direction of the control system 790, storage modules 720 may be automatically moved from stock storage 714 to particular stowing stations, for example using the bots 722. At the stowing station(s), the received inventory may be manually or automatically placed in locations on the storage modules 720 under direction of the control system 790. The storage modules 714 are returned from the stowing station(s) to stock storage 714, for example using the bots 722. In some embodiments, induction and stowing may be combined at one or more of the stow stations 712 so that individual items for orders can be inducted into a conveyance mechanism (not pictured) from storage modules 720 for delivery to one or more downstream processing stations (e.g., sorting stations) and received items can be stowed to the same storage modules 720 prior to the storage modules 720 being returned to stock storage 714. Storage modules 714 may also be moved from stock storage 714 to the induction/stowing station(s) specifically for stowing.

The various areas, operations and stations of materials handling facility 700 may be located in one building or facility, or alternatively may be spread or subdivided across two or more buildings or facilities. In addition, materials handling facility 700 may include one or multiple levels or floors. For example, materials handling facility 700 may include one, two, or more levels; in multi-level stow areas 700, a separate inventory 710 area may located on each of two or more levels, and various downstream processing stations may be located on one or more of the levels.

The configuration of materials handling facility 700, including the configuration of inventory 710 area, as shown in FIG. 7 is given by way of example, and is not intended to be limiting. Other configurations for materials handling facility 700, and inventory 710 area are possible and contemplated.

In addition, a materials handling facility may include two or more inventory 710 areas, which may be similarly or differently configured. A materials handling facility may, for example, have two or more levels, with a separate inventory 710 area located on at least two different levels. In these configurations, bots 722 may be directed, either automatically by control system 790 or by operator input to the control system 790, from one inventory 710 area to another inventory 710 area. For example when a first inventory 710 area has high demand and needs more bots 722, while a second inventory 710 area has less demand and can spare at least one bot 722, at least one bot 722 may be directed from the second inventory 710 area to the first inventory 710 area. In multi-level facilities, lifts may be provided to convey bots 722 between levels as necessary or desired. A bot 722 may be remotely directed, by the control system 790, to go to a lift, get on the lift, get off the lift at the appropriate level, and proceed to an inventory 710 area on the level. In at least some embodiments, as an alternative to directing the movement of bots 722 between inventory 710 areas to meet demand needs, control system 790 may instead direct stows from one inventory 710 area to another inventory 710 area or areas. For example, if the control system 790 detects that a particular inventory 710 area is falling behind, the control system 790 may shift some of the stow load to another inventory area 710.

In some implementations, an inventory 710 area may be subdivided into zones, for example a zone of the stock storage area corresponding to (and nearby) each stow station, and one or more bots may be assigned to operate within each zone. In these implementations, for example to handle differences in demand, bots 722 may be directed, either automatically by control system 790 or by operator input to the control system 790, from one zone to another zone in the inventory 710 area, or alternatively stow load may be directed from one zone to another zone in an inventory 710 area.

FIGS. 8A and 8B illustrate an example mobile robotic device (bot) that may be used in at least some embodiments. The shape, size, and configuration of the bot 722 and its components are examples for illustrative purposes, and are not intended to be limiting. FIG. 8A shows a top view of the example bot 722, and FIG. 8B shows a side view of the bot 722. A bot 722 may include at least a body or chassis, a lift mechanism located on top of the body for lifting storage modules 720, and wheels (or other mechanisms such as tracks or treads) located underneath the body. While FIG. 8A shows a circular lift mechanism, the lift mechanism may be other shapes. While FIGS. 8A and 8B show a bot 722 with four wheels, a bot 722 may include more or fewer wheels, for example two rows of three wheels, three rows with four wheels in each row, and so on. Also, different wheels may have different functions; for example, one or more wheels may be drive wheels, one or more wheels may be steerable wheels, and one or more wheels may just be free-rolling wheels. In some implementations, a bot 722 may be configured to raise and lower the body relative to the wheels. In some implementations, a bot may not include a separate lift mechanism as shown in FIGS. 8A and 8B for lifting storage modules 720; instead, raising and lowering the body relative to the wheels may act to lift and lower storage modules 720.

A bot 722 may be short enough, with the lift mechanism lowered, to fit under storage modules 720. In some embodiments, the bot 722 may be short enough to pass under other components of the materials handling facility. As shown in FIG. 8B, a bot 722 may include at least one drive motor for driving the wheels, at least one lift motor for raising and lowering the lift mechanism, communications and control components that may communicate (e.g., via wireless communications) with a control system 790 or other external devices and control motions and actions of the bot 722 under direction of the control system 790 and/or autonomously, and one or more sensors that may, for example sense the current location of the bot 722 in the materials handling facility and/or the location of the bot 722 relative to other external objects, devices, or stations in the materials handling facility. Communications and control components may include at least one computing device similar in architecture to the example computer system 900 illustrated in FIG. 12, which may store computer code and data for controlling the bot 722. The sensors may include optical sensors, tactile sensors, and/or other types of sensors. A bot 722 may also include at least one power supply and/or connection for connecting to an external power source. In some embodiments, the power supply may be or may include a rechargeable battery. A bot 722 may include other components, for example video cameras, audible alarms, external lights, access panels, external controls such as on/off buttons, antennas, and Radio Frequency Identifier (RFID) devices. For example, a bot 722 may include an RFID tag that uniquely identifies the bot 722 in the materials handling facility. However, other techniques or devices may be used to uniquely identify bots 722 in the materials handling facility.

A materials handling facility may include sensors, RFID readers, or other devices that enable the control system 790 to determine, and track the location of specific bots 722 in the facility via wired or wireless communications. A materials handling facility may also include transmitters or similar devices that enable the control system 290 to direct the motions and actions of specific bots 722. In some implementations, a materials handling facility may include guide strips, tracks, or other techniques for guiding the movements of the bots 722 in the facility, either autonomously or under control of the control system 790. For example, the aisles in the inventory 710 area illustrated in FIG. 7 may have guide strips embedded in or attached to the surface of the floor for guiding the bots 722.

In some implementations, a materials handling facility may use two or more different types or configurations of bots 722 for moving different types or configurations of storage modules.

FIGS. 9A and 9B illustrate an example storage module that may be used in at least some embodiments. FIG. 9A shows a front view of an example storage module 720, and FIG. 9B shows a side view of the example storage module 720 of FIG. 9A. A storage module 720 may include one or more locations 726 into which units of items may be stowed. In some implementations, only one type of item is stowed in each location 726. However, implementations are possible in which two or more different types of items may be stowed in a location 726. FIG. 9A shows an example configuration for a storage module 720 that may be used in some implementations, and is not intended to be limiting. Storage modules 720 may have different configurations and storage module types, and storage modules 720 with different configurations may be used together in an implementation of an inventory 710 area. In various implementations, storage modules 720 may have different numbers of locations, and/or different sizes of locations. In some implementations, a storage module 720 may have two or more different sizes of locations to accommodate more or fewer items and/or larger or smaller items. In some embodiments two or more storage modules may be combined into a storage unit. When storage module is selected for a stow operation, the entire storage unit may be transported.

As shown in FIGS. 9A and 9B, a storage module 720 may include legs that raise the bottom shelf of the unit 720 high enough so that a bot 722 can fit under the unit 720. This example shows four legs arranged at the corners of the unit 720; however, other numbers or configurations of legs are possible.

Each storage module 720 may include at least one indicator 728 associated with each location 726 of the storage module 720. An indicator 728 may, for example, be used to indicate, at a stow station 712, that a unit of an item is to be stowed into 726 under control of control system 790. The indicator 728 may be a light, an audio signal, or some other mechanism or combination of mechanisms capable of conveying audible, visual, and/or other information to a human operator. As an alternative, or in addition, to indicators 728 physically located proximate to locations of storage module 720, textual and/or graphical directions may be displayed on a monitor of a computer, hand-held device, etc., or printed to paper output for operator(s) at a stow station 712.

Each storage module 720 may include at least one identifier 729, which may be attached to or integrated in a leg (as shown) or attached to or integrated in some other portion or surface of the unit 720. The identifier 729 may uniquely identify the storage module 720 in an inventory 710 area, or in the materials handling facility. For example, a storage module 720 may include an RFID tag that uniquely identifies the storage module 720 in the materials handling facility. However, other techniques or devices may be used to uniquely identify storage modules 720.

FIG. 10 illustrates an example bot with a storage module, according to at least some embodiments. A bot 722, under control of control system 790, may move underneath a storage module 790, and may raise the lift mechanism to lift the storage module 720 off the floor. The bot 722 may then, under control of the control system and/or autonomously, move the storage module 720 to another location, for example to a specific stow station 712 of an inventory 710 area. A bot 722 with a storage module lifted, as illustrated in FIG. 10, may be referred to as a bot with storage module 724.

Example Layout of Materials Handling Facility for Transporting Items to Inventory Area FIG. 8 illustrates an example of a physical layout of the stow area of a materials handling facility in which items may be transported to an inventory storage area, according to some embodiments. Materials handling facility 800 is implementing a stow process in a materials handling facility, such as described above with regard to FIG. 2 above. Items may be received at a materials handling facility 800 in receiving 880. Some items may be identified as ready to be stowed 812. Control system 890 may be a control system, such as described above with regard to FIG. 1. Inventory area 810 may include one or more storage modules 820, such as the storage modules described above with regard to FIGS. 7 through 10. Control system 890 may direct a stower 822 to transport a received item 812 to a selected storage module and perform a stow operation stowing the item into the selected storage module, according to the methods outlined in FIGS. 3 through 6 above. Control system 890 may communicate stow directions to stowers 822 using various methods, including but not limited to paper print out, electronic display, a portable inventory reporting device, such as described above with regard to FIG. 1. Communications may travel on a wired or wireless network.

A stower 822 may be a human or robotic operator capable of stowing one or more items into a storage module 820. Control system may 890 direct stowers 822 to multiple selected storage modules 820. In some embodiments, stowers 822 may indicate to the control system 890 when items are stowed in a storage module 820, such that control system 890 may update the stowability information for the storage module 820. A control system 890 may direct stow operations for multiple inventory areas 810 and balance the stow load of received items by selecting storage modules 820 in different inventory areas 810.

The various areas, operations of stow area 800 may be located in one building or facility, or alternatively may be spread or subdivided across two or more buildings or facilities. In addition, stow area 800 may include one or multiple levels or floors. For example, a stow area 800 may include one, two, or more levels; in multi-level stow areas 800, a separate inventory 810 area may located on each of two or more levels, and various downstream processing stations may be located on one or more of the levels.

The configuration of materials handling facility 800, including the configuration of inventory 810 area, as shown in FIG. 8 is given by way of example, and is not intended to be limiting. Other configurations for materials handling facility 800, and inventory area 810 are possible and contemplated.

Example System

Figure 12:
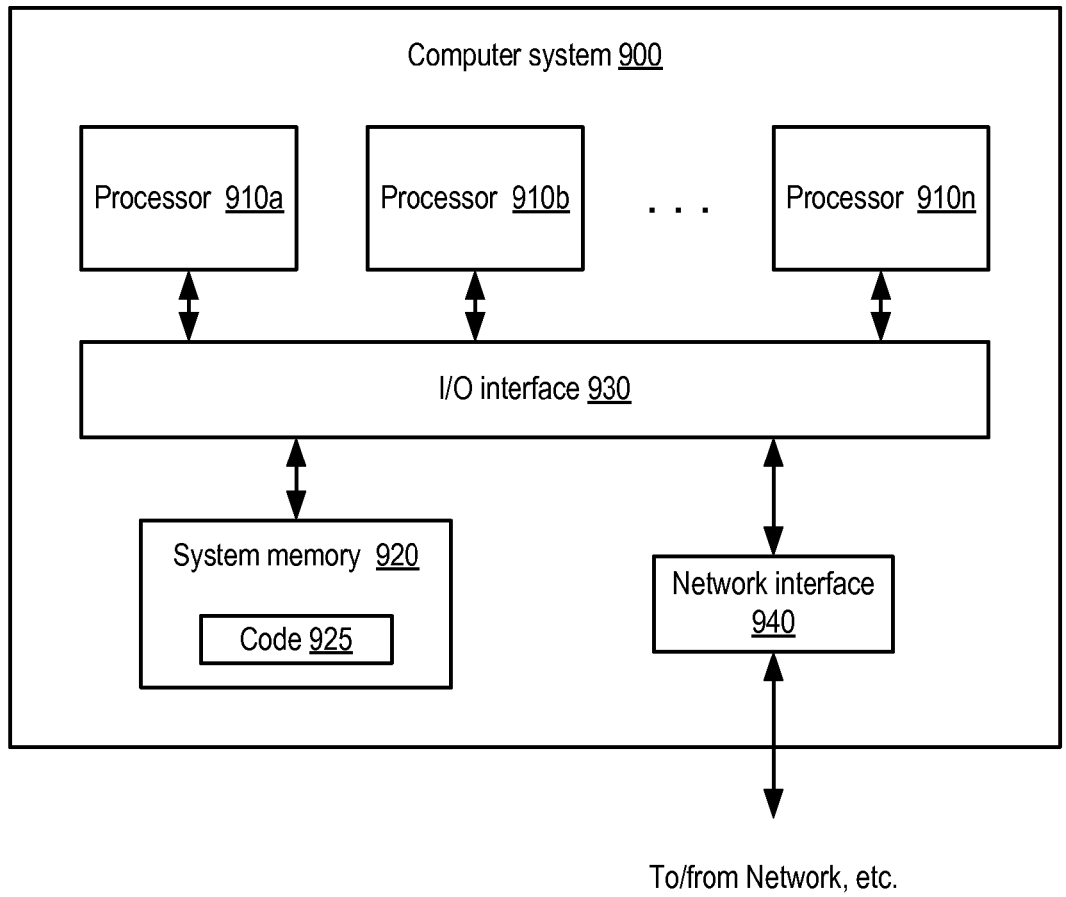
FIG. 12 illustrates an example system, according to some embodiments.

In at least some embodiments, a system that implements a control system that implements determining stowability based on item-size categories may include a general-purpose computer system that includes or is configured to access one or more computer-accessible media, such as computer system 900 illustrated in FIG. 12. In the illustrated embodiment, computer system 900 includes one or more processors 910 coupled to a system memory 920 via an input/output (I/O) interface 930. Computer system 900 further includes a network interface 940 coupled to I/O interface 930

In various embodiments, computer system 900 may be a uniprocessor system including one processor 910, or a multiprocessor system including several processors 910 (e.g., two, four, eight, or another suitable number). Processors 910 may be any suitable processors capable of executing instructions. For example, in various embodiments, processors 910 may be general-purpose or embedded processors implementing any of a variety of instruction set architectures (ISAs), such as the x86, PowerPC, SPARC, or MIPS ISAs, or any other suitable ISA. In multiprocessor systems, each of processors 910 may commonly, but not necessarily, implement the same ISA.

System memory 920 may be configured to store instructions and data accessible by processor(s) 910. In various embodiments, system memory 920 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those methods and techniques described above for a control system in a robotic induction technique and/or in a non-linear, unit-level materials handling system that implements the robotic induction technique, are shown stored within system memory 920 as code 925 and data 926.

In at least some embodiments, I/O interface 930 may be configured to coordinate I/O traffic between processor 910, system memory 920, and any peripheral devices in the device, including network interface 940 or other peripheral interfaces. In some embodiments, I/O interface 930 may perform any necessary protocol, timing or other data transformations to convert data signals from one component (e.g., system memory 920) into a format suitable for use by another component (e.g., processor 910). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components, such as a north bridge and a south bridge, for example. Also, in some embodiments some or all of the functionality of I/O interface 930, such as an interface to system memory 920, may be incorporated directly into processor 910.

Network interface 940 may be configured to allow data to be exchanged between computer system 900 and other devices attached to a network, such as other computer systems, communications devices, control mechanisms, readers, scanners and so on that are components of a control system in a materials handling system that implements the robotic induction technique. The communications channels may include, but are not limited to conventional and mobile telephone and text messaging communications channels. Network interface 940 may commonly support one or more wireless networking protocols (e.g., Wi-Fi/IEEE 802.11, or another wireless networking standard). However, in various embodiments, network interface 940 may support communication via any suitable wired or wireless general data networks, such as other types of Ethernet network, for example. Additionally, network interface 940 may support communication via telecommunications/telephony networks such as analog voice networks or digital fiber communications networks, via storage area networks such as Fibre Channel SANs, or via any other suitable type of network and/or protocol.

In some embodiments, system memory 920 may be one embodiment of a computer-accessible medium configured to store program instructions and data as described above for FIGS. 1 through 11 for implementing a control system for, or possibly other components of, control system that implements determining stowability based on item-size categories. However, in other embodiments, program instructions and/or data may be received, sent or stored upon different types of computer-accessible media. Generally speaking, a computer-accessible medium may include storage media or memory media such as magnetic or optical media, e.g., disk or DVD/CD coupled to computer system 900 via I/O interface 930. A computer-accessible medium may also include any volatile or non-volatile media such as RAM (e.g. SDRAM, DDR SDRAM, RDRAM, SRAM, etc.), ROM, etc, that may be included in some embodiments of computer system 900 as system memory 920 or another type of memory. Further, a computer-accessible medium may include transmission media or signals such as electrical, electromagnetic, or digital signals, conveyed via a communication medium such as a network and/or a wireless link, such as may be implemented via network interface 940.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A method, comprising:
performing, by one or more computing devices:
identifying an item-size category for each of a plurality of items in a materials handling facility, wherein said item-size category for each of the plurality of items is determined from among a plurality of different item-size categories according to size information for the item;
determining an item-size category descriptor for each of a plurality of storage modules, wherein the plurality of storage modules are fully-stowed storage modules, wherein the item-size category descriptor includes a quantity value for each different item-size category, and each quantity value indicates a total quantity of items stored in the fully-stowed storage module categorized in a respective one of the different item-size categories; and
generating a storage module capacity model that characterizes item-size category descriptors for fully-stowed storage modules.

2. The method of claim 1, further comprising, for each of multiple storage modules at a materials handling facility, tracking a capacity for the storage module to hold additional items according to the generated storage module capacity model, wherein said tracking comprises updating the capacity in response to an item being picked from the storage module.

3. The method of claim 2, further comprising selecting a storage module for a stow operation from among the multiple storage modules according to the capacities of the plurality of storage modules to hold additional items.

4. The method of claim 3, further comprising directing performance of the stow operation for stowing items received at the materials handling facility into the selected storage module.

5. The method of claim 4, further comprising determining an updated capacity for the selected storage module upon completion of the stow operation.

6. The method of claim 1, wherein said generating the storage module capacity model comprises:
mapping each item-size category descriptor as data points in an n-dimensional space, wherein each dimension of the n-dimensional space corresponds to a respective one of the different item-size categories, and each quantity value of the item-size category descriptor maps to a different dimension on the n-dimensional space;
fitting a function to the data points in the n-dimensional space to describe the determined item-size category descriptors for the plurality of storage modules.

7. The method of claim 6, further comprising determining a capacity for a storage module to hold additional items according to the generated storage module capacity model, comprising:
calculating a distance from an item-size descriptor of the storage module to the function for the storage module capacity model, wherein the distance provides a measure of the capacity of the storage module to hold additional items.

8. The method of claim 1, wherein the plurality of storage modules comprises a plurality of different storage module types, the method further comprising generating a different storage module capacity model for each different storage module type.

9. A system, comprising:
a plurality of storage modules at a material handling facility; and
a control system, implemented by one or more computers, configured to:
identify an item-size category for each of a plurality of items in the materials handling facility, wherein said item-size category for each of the plurality of items is determined from among a plurality of different item-size categories according to size information for the item;
determine an item-size category descriptor for each of the plurality of storage modules, wherein the plurality of storage modules are fully-stowed storage modules, wherein the item-size category descriptor includes a quantity value for each different item-size category, and each quantity value indicates a total quantity of items stored in the fully-stowed storage module categorized in a respective one of the different item-size categories; and generate a storage module capacity model that characterizes item-size category descriptors for fully-stowed storage modules.

10. The system of claim 9, wherein the control system is further configured to:
for each of the multiple storage modules at the materials handling facility, track a capacity for the storage module to hold additional items according to the generated storage module capacity model, wherein said track a capacity comprises updating the capacity in response to an item being picked from the storage module.

11. The system of claim 10, wherein the control system is further configured to:
select a storage module for a stow operation from among the multiple storage modules according to the capacities of the plurality of storage modules to hold additional items.

12. The system of claim 11, wherein the control system is further configured to:
direct performance of the stow operation for stowing items received at the materials handling facility into the selected storage module; and
determine an updated capacity for the selected storage module upon completion of the stow operation.

13. The system of claim 9, wherein to generate the storage module capacity module, the control system is further configured to:
map each item-size category descriptor as data points in an n-dimensional space, wherein each dimension of the n-dimensional space corresponds to a respective one of the different item-size categories, and each quantity value of the item-size category descriptor maps to a different dimension on the n-dimensional space; and
fit a function to the data points in the n-dimensional space to describe the determined item-size category descriptors for the plurality of storage modules.

14. The system of claim 13, wherein the control system is further configured to determine a capacity for a storage module of the plurality of storage modules to hold additional items according to the generated storage module capacity module, wherein to determine a capacity for a storage module to hold additional items according to the generated storage module capacity module, the control system is further configured to:
calculate a distance from an item-size descriptor of the storage module to the function for the storage module capacity model, wherein the distance provides a measure of the capacity of the storage module to hold additional items.

15. A non-transitory, computer-readable storage medium storing program instructions computer-executable to implement a control system configured to:
identify an item-size category for each of a plurality of items in a materials handling facility, wherein said item-size category for each of the plurality of items is determined from among a plurality of different item-size categories according to size information for the item;
determine an item-size category descriptor for each of a plurality of storage modules, wherein the plurality of storage modules are fully-stowed storage modules, wherein the item-size category descriptor includes a quantity value for each different item-size category, and each quantity value indicates a total quantity of items stored in the fully-stowed storage module categorized in a respective one of the different item-size categories; and
generate a storage module capacity model that characterizes item-size category descriptors for fully-stowed storage modules.

16. The non-transitory, computer-readable storage medium of claim 15, wherein the control system is further configured to:
for each of the multiple storage modules at the materials handling facility, track a capacity for the storage module to hold additional items according to the generated storage module capacity model, wherein said track a capacity comprises updating the capacity in response to an item being picked from the storage module.

17. The non-transitory, computer-readable storage medium of claim 16, wherein the control system is further configured to:
select a storage module for a stow operation from among the multiple storage modules according to the capacities of the plurality of storage modules to hold additional items.

18. The non-transitory, computer-readable storage medium of claim 17, wherein the control system is further configured to:
direct performance of the stow operation for stowing items received at the materials handling facility into the selected storage module; and
determine an updated capacity for the selected storage module upon completion of the stow operation.

19. The non-transitory, computer-readable storage medium of claim 15, wherein to generate the storage module capacity model, the control system is further configured to:
map each item-size category descriptor as data points in an n-dimensional space, wherein each dimension of the n-dimensional space corresponds to a respective one of the different item-size categories, and each quantity value of the item-size category descriptor maps to a different dimension on the n-dimensional space; and
fit a function to the data points in the n-dimensional space to describe the determined item-size category descriptors for the plurality of storage modules.

20. The non-transitory, computer-readable storage medium of claim 19, wherein the control system is further configured to determine a capacity for a storage module of the plurality of storage modules to hold additional items according to the generated storage module capacity module, wherein to determine a capacity for a storage module to hold additional items according to the generated storage module capacity module, the control system is further configured to:
calculate a distance from an item-size descriptor of the storage module to the function for the storage module capacity model, wherein the distance provides a measure of the capacity of the storage module to hold additional items.

* * * * *